(12) United States Patent
Kim

(10) Patent No.: US 7,438,110 B2
(45) Date of Patent: Oct. 21, 2008

(54) TIRE MOUNTING APPARATUS

(75) Inventor: Il-Gon Kim, Suwon-si (KR)

(73) Assignee: Kia Motors Corporation, Seoul (KR)

( * ) Notice: Subject to any disclaimer, the term of this patent is extended or adjusted under 35 U.S.C. 154(b) by 18 days.

(21) Appl. No.: 11/648,835

(22) Filed: Dec. 28, 2006

(65) Prior Publication Data

US 2008/0105386 A1    May 8, 2008

(30) Foreign Application Priority Data

Nov. 3, 2006    (KR) .................. 10-2006-0108192

(51) Int. Cl.
    *B60C 25/138*    (2006.01)
(52) U.S. Cl. .................... 157/1.24; 157/1.22
(58) Field of Classification Search ............ 157/1.11, 157/1.17, 1.22, 1.24, 1
    See application file for complete search history.

(56) References Cited

U.S. PATENT DOCUMENTS

| | | | | |
|---|---|---|---|---|
| 4,173,245 A | | 11/1979 | Schäfer | |
| 4,800,944 A | * | 1/1989 | Kane | 157/1.22 |
| 4,830,079 A | * | 5/1989 | Onuma | 157/1.24 |
| 5,222,538 A | * | 6/1993 | Tomita et al. | 157/1 |
| 5,224,532 A | * | 7/1993 | Kawabe et al. | 157/1 |
| 5,339,880 A | * | 8/1994 | Kawabe et al. | 157/1 |
| 5,452,599 A | | 9/1995 | Daudi et al. | |
| 6,659,153 B1 | * | 12/2003 | Kupka | 157/1.24 |
| 7,044,188 B2 | * | 5/2006 | Pellerin et al. | 157/1.17 |

FOREIGN PATENT DOCUMENTS

| EP | 0 947 360 A3 | 7/2000 |
|---|---|---|
| EP | 1 236 589 A3 | 7/2003 |

* cited by examiner

*Primary Examiner*—David B Thomas
(74) *Attorney, Agent, or Firm*—Morgan Lewis & Bockius LLP

(57) ABSTRACT

An adjustable tire mounting apparatus can be universally used to assemble various types of wheels and tires to each other. The apparatus includes a cone restricting movement of a wheel, a housing rotatable about the cone, a horizontal distance adjusting unit that adjusts a position of a horizontal movable body with respect to the housing in the radial direction, a vertical distance adjusting unit that adjusts a position of a vertical movable body with respect to the horizontal movable body in the vertical direction, a pressure roller disposed on the vertical movable body that presses a sidewall of a tire, expansion rollers that are disposed on the horizontal movable body and guide the bead of the tire to enter a rim of the wheel, and a control unit that controls operation of the horizontal and vertical distance adjusting units, depending on the types of the tire and wheel.

7 Claims, 3 Drawing Sheets

TIRE MOUNTING APPARATUS

CROSS-REFERENCE TO RELATED APPLICATIONS

The present application is based on, and claims priority from, Korean Application Serial Number 10-2006-0108192, filed on Nov. 3, 2006, the disclosure of which is hereby incorporated by reference herein in its entirety.

FIELD OF THE INVENTION

The present invention relates to a tire mounting apparatus that can be used to assemble tires and wheels of various types and sizes.

BACKGROUND OF THE INVENTION

In general, to mount a tire on a wheel, the wheel is lain on its side and a tire mounting apparatus then uses a pressure roller around the circumference of the sidewall of the tire, causing the rim of the tire to be fitted to the wheel. The tire mounting apparatus moves the pressure roller based on the type of tire and wheel being used. Various tire mounting apparatuses are used for various tires and wheels.

The amount of compression of the sidewall corresponds to characteristic properties of the tire such as elasticity and hardness. However, the conventional tire mounting apparatus does not vary the pressure with which the sidewall is pressed. The conventional tire mounting apparatus therefore cannot be used universally. If the pressure does not correspond to the elasticity of the tire, damage such as such as chop and scratch occurs on the bead of the tire.

The above information disclosed in this Background section is only for enhancement of understanding of the background of the invention and therefore it may contain information that does not form the prior art that is already known in this country to a person of ordinary skill in the art.

SUMMARY OF THE INVENTION

A tire mounting apparatus according to an embodiment of the present invention includes a center cone, a housing, a horizontal movable body, a horizontal distance adjusting unit, a vertical movable body, a vertical distance adjusting unit, a pressure roller, expansion rollers, and a control unit. The center cone is vertically disposed and restricts movement of the wheel at a central portion of a wheel. The housing is disposed on the outer periphery of and rotates about the center cone. The horizontal distance adjusting unit moves the horizontal movable body with respect to the housing in a radial direction. The vertical distance adjusting unit moves the vertical movable body with respect to the horizontal movable body in a vertical direction. The pressure roller is disposed on the vertical movable body and presses a sidewall of a tire during assembly of the tire. The expansion rollers are disposed on the horizontal movable body and guide the bead of the tire such that it enters a rim of the wheel during the assembly of the tire. The control unit controls the operation of the horizontal distance adjusting unit and vertical distance adjusting unit, depending on the sizes and other properties of the tire and wheel.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
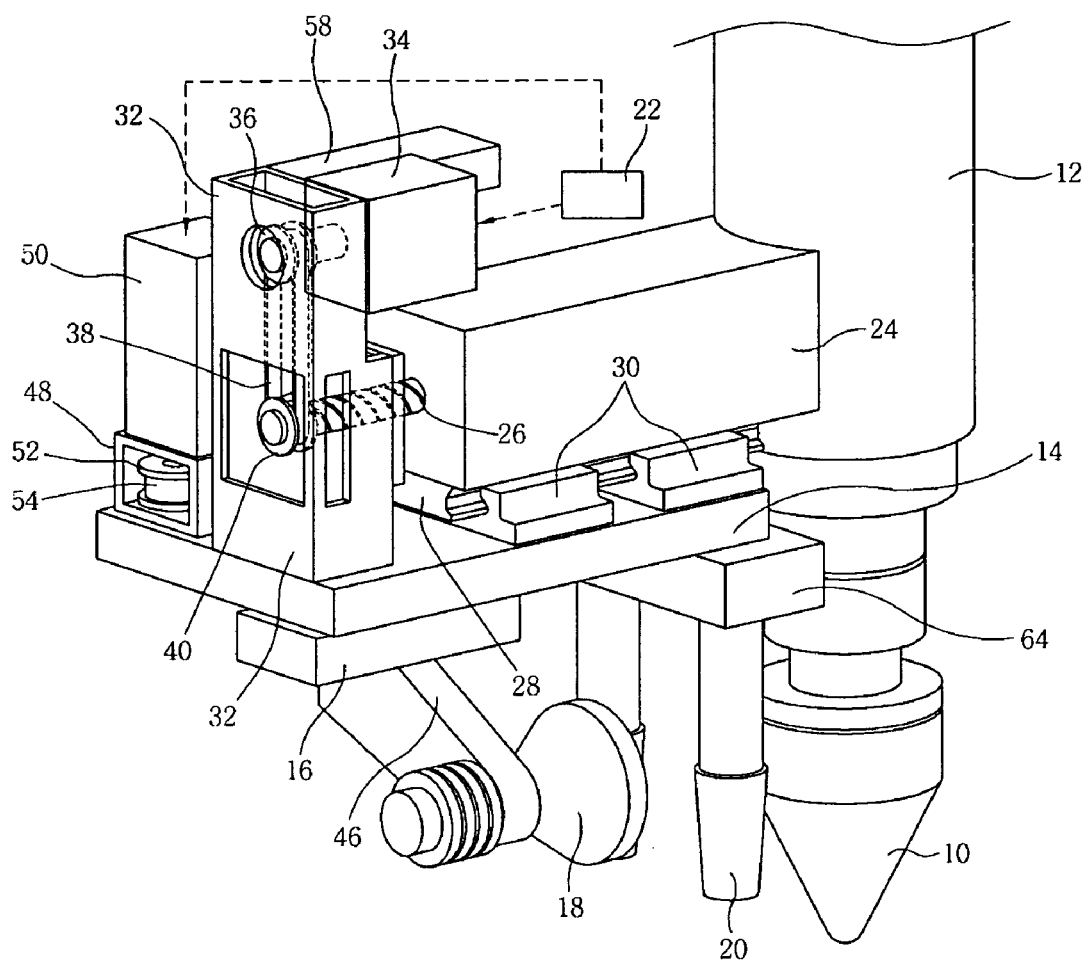
FIG. 1 is a front perspective view showing the structure of a tire mounting apparatus according to an embodiment of the present invention.
Figure 2:
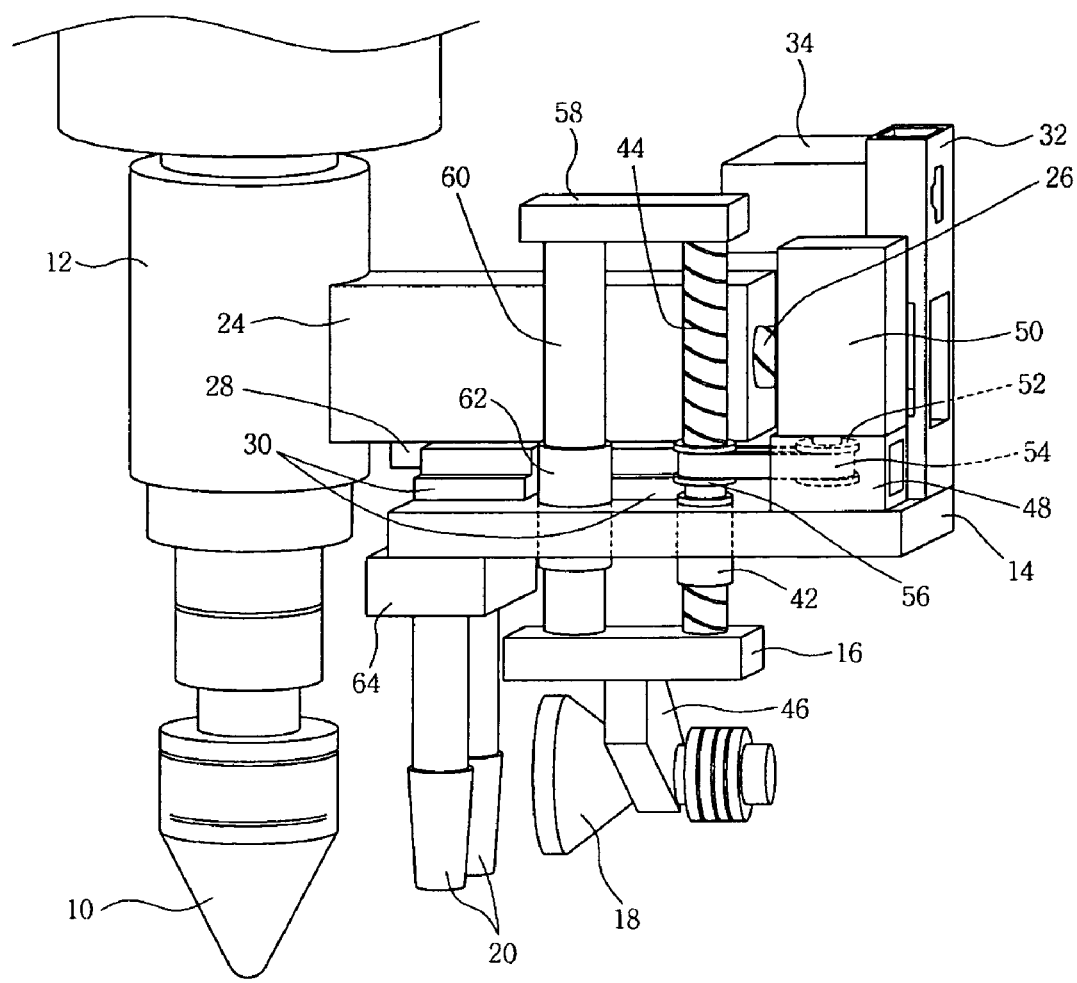
FIG. 2 is a rear perspective view of the tire mounting apparatus of FIG. 1.
Figure 3:
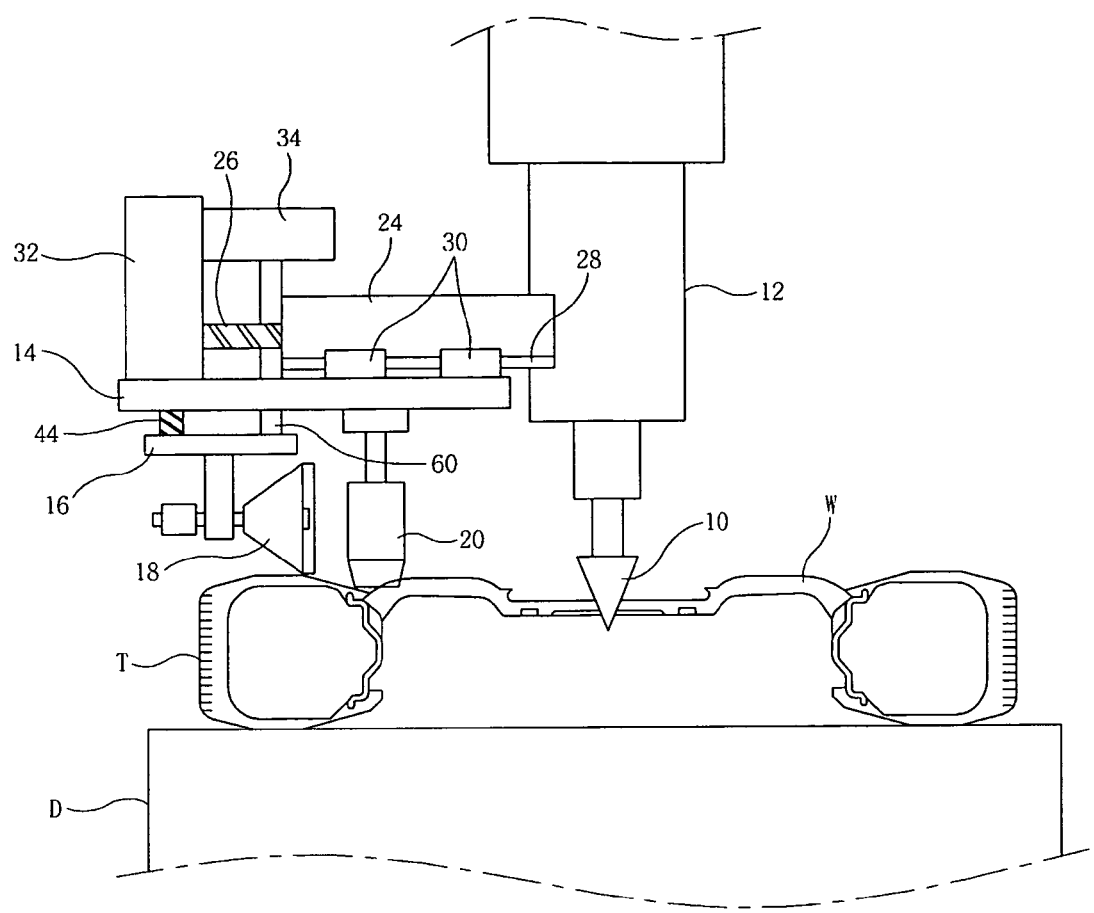
FIG. 3 is a front view illustrating a tire assembled to a wheel by the tire mounting apparatus of FIG. 1.

As shown in FIGS. 1 to 3, a tire mounting apparatus according to an embodiment of the present invention includes a holder such as center cone 10, a housing 12, a horizontal movable body 14, a horizontal distance adjusting unit, a vertical movable body 16, a vertical distance adjusting unit, a conical pressure roller 18, expansion rollers 20, and a control unit 22. Center cone 10 is vertically disposed, and is inserted into a central opening of a wheel W, which is placed on its side on a work table D, so as to restrain motion of wheel W. Housing 12 is disposed on the outer periphery of center cone 10, and rotates about center cone 10. Horizontal movable body 14 rotates together with housing 12, and can move with respect to housing 12 in a radial direction. The horizontal distance adjusting unit is provided between housing 12 and horizontal movable body 14, and moves horizontal movable body 14 radially with respect to housing 12. Vertical movable body 16 is supported by horizontal movable body 14, and can move with respect to horizontal movable body 14 in a vertical direction. The vertical distance adjusting unit is provided between horizontal movable body 14 and vertical movable body 16, and moves vertical movable body 16 with respect to horizontal movable body 14 in the vertical direction. Conical pressure roller 18 is disposed on vertical movable body 16, and presses the sidewall of a tire T when tire T and wheel W are assembled to each other. Expansion rollers 20 are disposed on horizontal movable body 14, and guide the bead of tire T to enter the rim of wheel W when tire T and wheel W are assembled to each other. Control unit 22 controls the operation of the horizontal distance adjusting unit and vertical distance adjusting unit, depending on the sizes and other properties of tire T and wheel W.

Control unit 22 may include a processor, memory, and associated hardware, software, and/or firmware as may be selected and programmed by a person of ordinary skill in the art based on the teachings herein.

Control unit 22 includes a manufacturing order receiver (not shown) that receives manufacturing orders based on the properties of wheel W and tire T supplied to the assembling process. Control unit 22 then controls the operation of the horizontal distance adjusting unit and vertical distance adjusting unit on the basis of the orders.

The horizontal distance adjusting unit includes a first ball box 24, a first ball screw 26, a first driving unit, a linear motion guide rail 28, and linear motion blocks 30. One end of first ball box 24 is attached to housing 12 such that it extends outward from housing 12 in the radial direction. A part of first ball screw 26 is engaged with first ball box 24. The first driving unit rotates first ball screw 26 on the basis of control of control unit 22. Linear motion guide rail 28 is provided on the lower surface of first ball box 24 and extends in the radial direction of housing 12. Linear motion blocks 30 are provided on the upper surface of horizontal movable body 14, and are engaged with linear motion guide rail 28.

The first driving unit includes a first servo motor 34, a first driving pulley 36, and a first driven pulley 40. First servo motor 34 is horizontally provided to the upper portion of a first mounting bracket 32, which is perpendicularly attached to horizontal movable body 14. First driving pulley 36 is attached to a rotating shaft of first servo motor 34. First driven pulley 40 is attached to an end of first ball screw 26, and is connected to first driving pulley 36 by a first belt 38.

Accordingly, when first ball screw 26 rotates due to the driving of first servo motor 34, first driving pulley 36 rotates first driven pulley 40 by first belt 38. As the engaging portions of first ball screw 26 and first ball box 24 move due to the rotation of first driven pulley 40, linear motion blocks 30 move with respect to linear motion guide rail 28. As a result, the position of horizontal movable body 14 is adjusted with respect to the position of housing 12 in the radial direction.

The vertical distance adjusting unit includes a second ball box 42, a second ball screw 44, a second driving unit, a first auxiliary mounting bracket 46, and a guide. Second ball box 42 penetrates horizontal movable body 14, and is attached to horizontal movable body 14 in a vertical direction. A part of second ball screw 44 is engaged with second ball box 42. The second driving unit rotates second ball screw 44 on the basis of the control of control unit 22. First auxiliary mounting bracket 46 is attached to vertical movable body 16, which is attached to the lower end of second ball screw 44, and pressure roller 18 is attached to auxiliary mounting bracket 46. When first auxiliary mounting bracket 46 moves with respect to horizontal movable body 14 in the vertical direction, the guide guides first auxiliary mounting bracket 46.

The second driving unit includes a second servo motor 50, a second driving pulley 52, and a second driven pulley 56. Second servo motor 50 is attached to horizontal movable body 14 in the vertical direction through a second mounting bracket 48. Second driving pulley 52 is attached to a rotating shaft of second servo motor 50. Second driven pulley 56 is connected to second driving pulley 52 by a second belt 54, and is engaged with second ball screw 44 so as to rotate second ball screw 44.

Accordingly, when second ball screw 44 rotates due to the driving of second servo motor 50, second driving pulley 52 rotates second driven pulley 56 by second belt 54. As the engaging portions of second ball screw 44 and second ball box 42 move due to the rotation of second driven pulley 56, vertical movable body 16 moves with respect to the position of horizontal movable body 14. As a result, the position of vertical movable body 16 is adjusted with respect to the position of horizontal movable body 14 in the vertical direction.

The guide includes a second auxiliary mounting bracket 58, a guiding rod 60, and a guiding bush 62. Second auxiliary mounting bracket 58 is horizontally fixed to the upper end of second ball screw 44. One end of guiding rod 60 is attached to second auxiliary mounting bracket 58, and the other end of guiding rod 60 passes through horizontal movable body 14 and is attached to vertical movable body 16 so that guiding rod 60 is parallel to second ball screw 44. Guiding bush 62 is fixed to horizontal movable body 14 in the vertical direction, so that guiding rod 60 passes through guiding bush 62.

Accordingly, when vertical movable body 16 moves vertically due to the driving of second servo motor 50, vertical movable body 16 does not rotate due to guiding rod 60 and can move in the vertical direction. As a result, pressure roller 18 is always oriented along the radial direction of housing 12.

Since expansion rollers 20 are disposed on horizontal movable body 14, the lower ends of expansion rollers 20 are positioned above the rim during the assembly of tire T.

Hereinafter, the operation of the tire mounting apparatus according to an embodiment of the present invention will be described in detail.

When tire T and wheel W are lain on their sides on work table D, center cone 10 is inserted into the central portion of wheel W so as to restrict movement of wheel W on work table D.

Control unit 22 receives appropriate manufacturing orders based on the sizes and other properties of wheel W and tire T, and controls the horizontal distance adjusting unit and vertical distance adjusting unit.

Control unit 22 may first control the operation of first servo motor 34 such that the radial position of horizontal movable body 14 is adjusted. As a result, pressure roller 18 and expansion rollers 20 are positioned at radial positions corresponding to the sidewall of tire T and the rim of wheel W, respectively.

Subsequently, control unit 22 may control the operation of second servo motor 50 such that the vertical position of vertical movable body 16 is adjusted. Accordingly, control unit 22 adjusts the degree to which pressure roller 18 presses the sidewall of tire T such that it corresponds to elasticity of the tire, etc.

As a result, when housing 12 rotates, pressure roller 18 presses the sidewall of tire T such that the bead of tire T enters the rim of wheel W. Expansion rollers 20 guide the bead so that the bead of tire T enters the inner side of the rim.

As described above, according to embodiments of the present invention, when different types of tires and wheels are assembled to each other, it is possible to adjust the pressure with which the wheel presses the tire based on properties of the tire. As a result, it is possible to use a single apparatus to assemble various types of wheels and tires to each other.

In addition, it is possible to appropriately press the wheel against the sidewall and to appropriately guide the bead of the tire into the rim of the wheel. As a result, it is possible to prevent damage of the bead occurring during the assembly of the tire.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A tire mounting apparatus comprising:
   a holder to restrict movement of a wheel;
   a housing that is rotatable about the holder;
   a first movable body movable in a substantially radial direction of the housing;
   a first distance adjusting unit that adjusts a position of the first movable body with respect to the housing in the radial direction;
   a second movable body movable with respect to the first movable body in a direction substantially perpendicular to the radial direction;
   a second distance adjusting unit that adjusts a position of the second movable body with respect to the first movable body in the perpendicular direction;
   a pressure roller that is disposed on the second movable body for pressing a sidewall of a tire during an assembly of the tire to the wheel;
   at least one expansion roller disposed on the first movable body to guide a bead of the tire so that the bead of the tire enters a rim of the wheel during the assembly of the tire; and
   a control unit that controls operation of the first and second distance adjusting units, depending on properties of the tire and the wheel;

wherein the first distance adjusting unit includes:
- a first ball box attached to the housing and extending substantially in the radial direction;
- a first ball screw engaged with the first ball box;
- a first driving unit for rotating the first ball screw on the basis of the control of the control unit;
- a first linear motion guide rail disposed on the first ball box; and
- at least one first linear motion block disposed on the first movable body and engaged with the first linear motion guide rail.

2. The tire mounting apparatus as defined in claim 1, wherein the first driving unit includes:
- a first motor disposed on to the first movable body and extending substantially in the radial direction;
- a first driving pulley rotated by the first motor; and
- a first driven pulley that is connected with the first driving pulley by a first belt for rotating the first ball screw.

3. A tire mounting apparatus comprising:
- a holder to restrict movement of a wheel;
- a housing that is rotatable about the holder;
- a first movable body movable in a substantially radial direction of the housing;
- a first distance adjusting unit that adjusts a position of the first movable body with respect to the housing in the radial direction;
- a second movable body movable with respect to the first movable body in a direction substantially perpendicular to the radial direction;
- a second distance adjusting unit that adjusts a position of the second movable body with respect to the first movable body in the perpendicular direction;
- a pressure roller that is disposed on the second movable body for pressing a sidewall of a tire during an assembly of the tire to the wheel;
- at least one expansion roller disposed on the first movable body to guide a bead of the tire so that the bead of the tire enters a rim of the wheel during the assembly of the tire; and
- a control unit that controls operation of the first and second distance adjusting units, depending on properties of the tire and the wheel;

wherein the second distance adjusting unit includes:
- a second ball box attached to the first movable body and extending substantially in the perpendicular direction;
- a second ball screw engaged with the second ball box;
- a second driving unit for rotating the second ball screw;
- a first auxiliary mounting bracket attached to the second movable body, which is attached to the second ball screw, so that the pressure roller is attached to the auxiliary mounting bracket; and
- a guide for guiding the first auxiliary mounting bracket when the first auxiliary mounting bracket moves with respect to the first movable body substantially in the perpendicular direction.

4. The tire mounting apparatus as defined in claim 3, wherein the second driving unit includes:
- a second motor disposed on the first movable body and extending substantially in the perpendicular direction;
- a second driving pulley rotated by the second motor; and
- a second driven pulley that is connected with the second driving pulley by a second belt for rotating the second ball screw.

5. The tire mounting apparatus as defined in claim 3, wherein the guide includes:
- a second auxiliary mounting bracket attached to the second ball screw;
- a guiding rod comprising a first and a second end, the first end being attached to the second auxiliary mounting bracket, and the second end passing though the first movable body and being attached to the second movable body so that the guiding rod is substantially parallel to the second ball screw; and
- a guiding bush attached to the first movable body substantially in the perpendicular direction so that the guiding rod passes though the guiding bush.

6. The tire mounting apparatus as defined in claim 1, wherein the expansion rollers are attached to the first movable body though a third auxiliary mounting bracket attached to the first movable body.

7. The tire mounting apparatus as defined in claim 3, wherein the expansion rollers are attached to the first movable body though a third auxiliary mounting bracket attached to the first movable body.

* * * * *